Sept. 12, 1961  D. FIRTH  2,999,394
CONVEYOR PULLEY OR THE LIKE
Filed Dec. 31, 1958
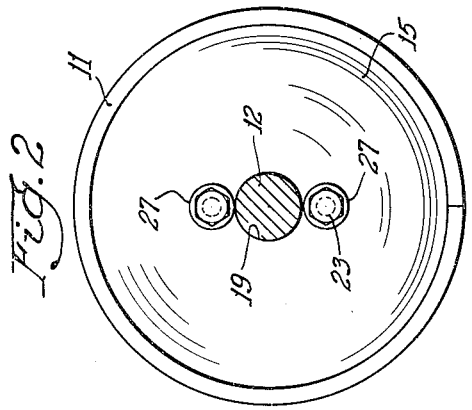
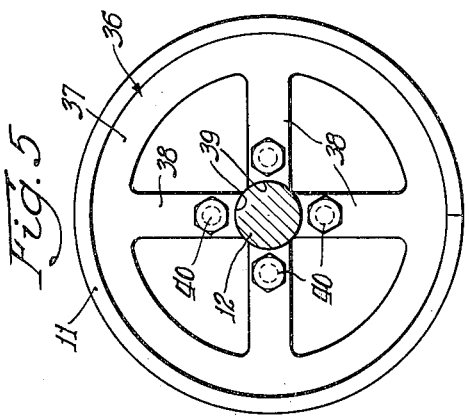
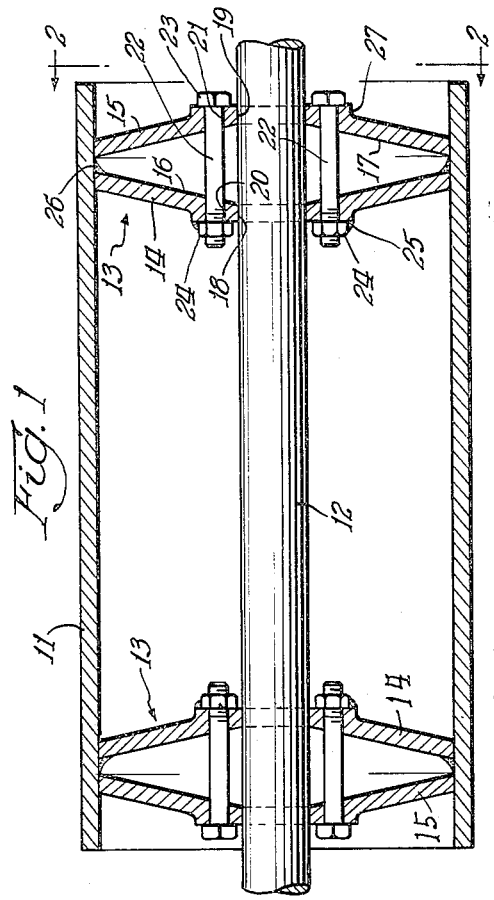
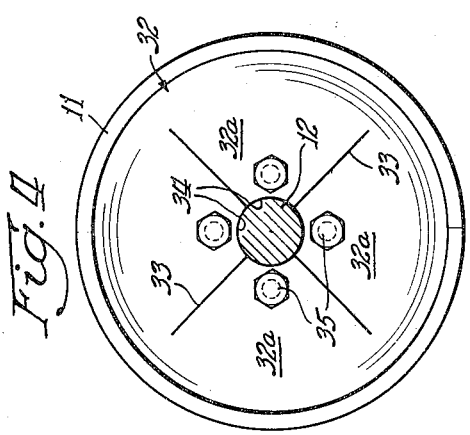
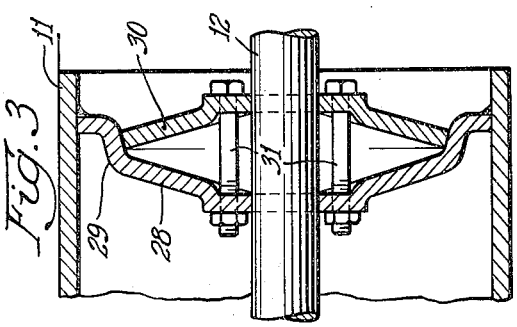
Inventor:
David Firth
By: Jones, Darbo & Robertson
Attys.

United States Patent Office 2,999,394
Patented Sept. 12, 1961

2,999,394
CONVEYOR PULLEY OR THE LIKE
David Firth, South Bend, Ind., assignor to Dodge Manufacturing Corporation, Mishawaka, Ind., a corporation of Indiana
Filed Dec. 31, 1958, Ser. No. 784,264
8 Claims. (Cl. 74—230.8)

This invention relates to conveyor pulley or the like more particularly for use in belt conveyors for moving packaged articles of merchandise or other similar objects in manufacturing and commercial establishments.

A problem has been encountered in this field of supplying a light-weight pulley for the purpose indicated that may be simply and inexpensively constructed and that at the same time will provide the strength and durability for long and trouble-free use.

An object of the present invention is to provide a pulley of this class, that may be inexpensively produced and sold at a relatively low price, by eliminating the usual heavy and expensive hub structure characteristic of conventional pulleys and causing the end discs themselves to provide the hub structure.

A further object is the provision in a pulley of this class of a pair of cooperating end discs or plates one of which may be permanently incorporated within the rim member and the other of which may be assembled with the first disc by take-up bolts, which when drawn up, urge the discs to a flattened position thereby clamping them on the shaft.

Other objects and advantages will be apparent from the following description, taken together with the accompanying drawings, showing illustrative embodiments of the invention, and in which drawings—

FIGURE 1 is an axial sectional view through the longitudinal axis of a pulley as it might be located on a shaft;

FIGURE 2 is an end elevation of the structure of FIG. 1, and being a section taken on the line 2—2 of FIG. 1;

FIGURE 3 shows an alternative construction;

FIGURE 4 shows a further modification in which the outer disc is sectored; and

FIGURE 5 is a still further modification in which the outer disc has inwardly extending spokes or arms.

Referring in detail to the illustrative construction shown in the drawings and turning first to FIGS. 1 and 2, the numeral 11 indicates a pulley rim of sheet steel for example which may be formed into cylindrical shape and seam-welded as is customary in such practice, thus providing a drum-like member over which a flexible endless conveyor belt may be entrained to run thereon under the influence of rotation of the conveyor mechanism shaft 12 that is suitably journalled and driven as need not be here shown.

In accordance with the present invention, at each end of the rim member 11, in this instance is provided a hub structure 13, only one of which, that at the right-hand end of FIG. 1 for example, need be here described in detail, it being understood that the other structure 13 is similar and complementary.

Each hub structure 13 of the present invention comprises a pair of separate concentric circular discs 14 and 15.

Disc 14 being a first or inner disc, is permanently secured in the rim member, while a second or outer of these discs 15 is insertable therein initially loosely. The discs are formed of frusto-conical design being each concavely dished on its face opposing the other disc as at 16 and 17 respectively. The discs are centrally perforated as at 18 and 19 respectively to somewhat closely pass therethrough the shaft 12. The discs also have registering holes 20 and 21 in the plates thereof respectively, adjacent the perforations 18 and 19 for the purpose of having passed therethrough take-up bolts 22 having heads 23 accessible on the outer face of the outer disc 15. The inner face of the inner disc 14 carries nuts 24 that are advantageously tack-welded as at 25 to the disc 14 so as to be held in position and prevent turning of the nuts when the bolts 22 are passed through the two discs and drawn up by rotating the bolt clockwise.

Inner disc 14 is desirably initially peripherally fillet welded to the rim member 11 as at 26, this weld being preferably continuous for the entire 360 degrees of the inner surface of the rim member.

The second or outer disc 15 is then entered into the rim member with its periphery in abutment with the weld 26.

Either before or after the outer disc 15 is inserted in the rim member, and in any case before the bolts 22 are tightened in the nuts 24, the shaft 12 is passed through the hub structure thus provided that is through the perforations 18 and 19. So constructed and arranged, a slip fit for the structure on the shaft is effected with say a clearance of from .003 to .005 of an inch.

When now the bolts 22 are tightened or drawn up, the discs 14 and 15 are pulled towards each other and are urged to a flattened out condition thereby tending to increase their diameter or to contract the shaft perforations 18 and 19 and thereby cause the discs to tightly grip the shaft. At the same time the disc periphery is wedged into the rim member. Disc 15 periphery may abut the weld 26 on the periphery of the disc 14 to provide a stop or fulcrum that assists in the desired flattening influence of the bolts.

In order to cause the bolts 22 to exert an influence in an axial direction upon the discs throughout the peripheries of the heads and nuts of the bolts, the holes 20 and 21 are desirably environed by bosses 27 formed on the discs that thus provide a flat abutment for the bolt heads and nuts.

While two bolts are shown in FIGS. 1 and 2, it will be understood that any suitable plurality could be employed.

In the modification shown of FIG. 3, the inner disc 28 has an interior concentric offset 29 against which an outer disc 30 of smaller diameter is peripherally abutted. In this form, when the bolts 31 are tightened or drawn up, the offset 29 provides a stop or fulcrum for the outer disc 30 which assists in the flattening action of the bolts 31 that thus clamp the discs 28 and 30 tightly onto the shaft 12.

In the further modification shown in FIG. 4 the outer disc 32, which here may be the same diameter as the disc 14 and used therewith, is sectored by slits 33, in this instance into four sectors each of which has an arcuate inner end 34 that is pinched onto the shaft 12 when the bolts 35 are drawn up similarly to the bolts 22 and 31, there being advantageously one of the bolts 35 for each of the four sectors 32a of the disc 32.

In the still further modification of FIG. 5 the outer disc 36 which also may be used with an inner disc 14 has an annular periphery 37 and internal spokes or arms 38, in this instance four in number, and having arcuate inner ends 39 that are pinched onto the shaft 12 when the bolts 40 for each of the arms 38 are tightened.

If it be desired to dismount the pulley from the shaft the bolts need only be loosened and the resiliency of the plates restores them to their initially dished condition thereby enlarging the perforations in the discs for the shaft.

It will be understood that both the inner and the outer discs, such as for example both 14 and 15, could be made in the alternative forms shown in FIGS. 4 and 5, In any case it will be apparent, by reason of the close initial clearance of the plates on the shaft, very slight movements of the plates toward each other, or flattening, is required to effect the constriction of the perforations 18 and 19 and the resultant clamping action onto the shaft 12.

It will also be understood that the assembly 13 at the left-hand end of FIG. 1 is conveniently identical with that at the right-hand end but merely reversed so that 14 is the inner disc and 15 the outer.

So constructed and arranged, a light-weight inexpensive pulley is provided that is readily installed on a conveyor shaft to rotate therewith without slippage and while being readily mounted or dismounted.

Such changes may be made as fall within the scope of the appended claims without departing from the invention.

What is here claimed is:

1. A hubless pulley of the class described comprising, a cylindrical drum-like rim member, a pair of separate concentric circular discs received within said rim member and centrally perforated to closely pass a shaft therethrough, said discs being respectively concavely dished on their opposing faces, a first of said discs being permanently peripherally integrated with said rim member thereby forming a unit with it and a second of said discs being inserted into said rim member and bearing at its periphery on said unit, said discs having holes therethrough spaced around said central perforations and located close to it, and take-up means each including a threaded bolt member extending between the discs and passing through the holes and each arranged for screwing action with another threaded member to draw the discs toward one another whereby the discs may be clamped onto the shaft by flexing thereof, the periphery of the second disc being simultaneously tightened against said unit by said takeup means, one of the threaded members of the take-up means being integrated with the first disc.

2. The pulley of claim 1 wherein both discs are peripherally abutted against the inner face of the rim member.

3. The pulley of claim 1 wherein the first disc has its periphery welded to the inner face of the rim member and the second disc has its periphery abutted against said weld.

4. The structure of claim 1 wherein the first disc has an annular radially facing shoulder and said second disc has a wedging peripheral fit with said shoulder whereby the second disc is firmly engaged peripherally to the first disc for frictional torque resistance aside from the flexing thereof.

5. The structure of claim 1 wherein said second disc peripherally engages said unit, when drawn tight and aside from flexing thereof, with a firm torque transmitting engagement whereby said second disc, when flexed to tighten on said shaft, transmits driving torque between said rim and said shaft independently of the bolts.

6. A hubless pulley according to claim 1 in which the rim member is open at both ends, and including two pairs of discs, each according to said claim; with the second disc of each pair exposed to one of the open ends of the rim member, being positioned on the side toward said end of the first disc of the same pair, which first disc in turn is closer to said end than the other pair.

7. The structure of claim 1 wherein at least one of said discs has radial slits opening into its central perforation and a take-up bolt passes through each sector defined by said slits.

8. The structure of claim 1 wherein at least one of said discs comprises an annulus having a plurality of inwardly extending arms spaced apart centrally of the disc to provide said perforation, each of said arms being apertured for a take-up bolt adjacent its inner end.

References Cited in the file of this patent

UNITED STATES PATENTS

| | | |
|---|---|---|
| 314,206 | Turner | Mar. 17, 1885 |
| 2,207,534 | Corlett | July 9, 1940 |
| 2,460,510 | Laesser | Feb. 1, 1949 |
| 2,724,975 | Drummond | Nov. 29, 1955 |
| 2,767,590 | Currier | Oct. 23, 1956 |

FOREIGN PATENTS

| | | |
|---|---|---|
| 196,622 | Great Britain | Apr. 10, 1924 |
| 394,721 | Germany | May 5, 1924 |
| 452,302 | Germany | Nov. 8, 1927 |
| 427,591 | Italy | Nov. 24, 1947 |
| 670,392 | Great Britain | Apr. 16, 1952 |
| 845,001 | Germany | July 28, 1952 |
| 708,292 | Great Britain | May 5, 1954 |